United States Patent
Krupa et al.

(10) Patent No.: US 10,718,991 B2
(45) Date of Patent: Jul. 21, 2020

(54) DEVICE FOR GENERATING A POLYCHROMATIC AND SPATIALLY SELF-ADAPTED BEAM OF PHOTONS

(71) Applicants: CENTRE NATIONAL DE LA RECHERCHE SCIENTIFIQUE, Paris (FR); UNIVERSITÉ DE LIMOGES, Limoges (FR)

(72) Inventors: Katarzyna Krupa, Brescia (IT); Badr Shalaby, Limoges (FR); Alexis Labruyère, Limoges (FR); Alessandro Tonello, Limoges (FR); Vincent Couderc, Verneuil-sur-Vienne (FR)

(73) Assignees: CENTRE NATIONAL DE LA RECHERCHE SCIENTIFIQUE, Paris (FR); UNIVERSITÉ DE LIMOGES, Limoges (FR)

( * ) Notice: Subject to any disclaimer, the term of this patent is extended or adjusted under 35 U.S.C. 154(b) by 0 days.

(21) Appl. No.: 16/072,066

(22) PCT Filed: Jan. 20, 2017

(86) PCT No.: PCT/FR2017/050124
§ 371 (c)(1),
(2) Date: Sep. 26, 2018

(87) PCT Pub. No.: WO2017/125691
PCT Pub. Date: Jul. 27, 2017

(65) Prior Publication Data
US 2019/0041721 A1 Feb. 7, 2019

(30) Foreign Application Priority Data
Jan. 22, 2016 (FR) ..................... 16 50525

(51) Int. Cl.
*G02F 1/35* (2006.01)
*G01N 21/65* (2006.01)

(52) U.S. Cl.
CPC ............. *G02F 1/353* (2013.01); *G01N 21/65* (2013.01); *G01N 2021/653* (2013.01);
(Continued)

(58) Field of Classification Search
None
See application file for complete search history.

(56) References Cited

U.S. PATENT DOCUMENTS 3,524,147 A * 8/1970 Maiman .................... G02F 1/37
359/276
4,019,159 A 4/1977 Hon et al.
(Continued)

FOREIGN PATENT DOCUMENTS

EP 1248143 A2 10/2002
WO WO02/057846 A2 7/2002

OTHER PUBLICATIONS

Weissbuch, I. et al. "Centrosymmetric Crystals as Host Matrices for Second-Order Optical Nonlinear Effects," American Chemical Society, vol. 1 No. 1, p. 114-118, 1989. (Year: 1989).*
(Continued)

*Primary Examiner* — Rhonda S Peace
(74) *Attorney, Agent, or Firm* — Kenealy Vaidya LLP

(57) ABSTRACT

Some embodiments are directed to a generating device, including a pulse laser source providing primary photons having at least one wavelength, shaping device(s) acting on the primary photons to provide an input beam, a nonlinear crystal, and controller(s) generating, in the nonlinear crystal, at least one electric field that is synchronous with the input beam and suitable for inducing a phase mismatching in the nonlinear crystal through an electro-optical effect, in order to
(Continued)

convert the primary photons of the input beam into secondary photons having wavelengths belonging to a supercontinuum.

19 Claims, 2 Drawing Sheets

(52) U.S. Cl.
CPC ............... *G02F 2001/3528* (2013.01); *G02F 2001/3546* (2013.01); *G02F 2001/3548* (2013.01); *G02F 2202/36* (2013.01)

(56) References Cited

U.S. PATENT DOCUMENTS

| | | | | |
|---|---|---|---|---|
| 4,996,495 | A * | 2/1991 | Birx | H03K 3/57 307/106 |
| 5,028,816 | A | 7/1991 | Boczar | |
| 5,028,971 | A * | 7/1991 | Kim | H01L 27/14 250/214.1 |
| 5,644,422 | A * | 7/1997 | Bortz | G02F 1/37 359/326 |
| 6,771,409 | B2 * | 8/2004 | Huang | G02F 1/011 359/238 |
| 7,190,705 | B2 * | 3/2007 | Fermann | H01S 3/0057 372/18 |
| 7,773,643 | B2 * | 8/2010 | Masuda | G02F 1/0121 372/12 |
| 8,023,179 | B2 * | 9/2011 | Nicholson | G02F 1/353 359/326 |
| 8,446,580 | B2 * | 5/2013 | Cerullo | G01J 3/44 356/301 |
| 9,800,399 | B2 * | 10/2017 | Tanzilli | H04L 9/0852 |
| 9,841,656 | B2 * | 12/2017 | Deyra | G02F 1/3501 |
| 2006/0002437 | A1 * | 1/2006 | Braun | G02F 1/365 372/22 |
| 2011/0147566 | A1 | 6/2011 | Furuya et al. | |
| 2012/0236314 | A1 | 9/2012 | Fermann et al. | |
| 2019/0041721 | A1 * | 2/2019 | Krupa | G01N 21/65 |

OTHER PUBLICATIONS

Lee, C. H., "Picosecond Optics and Microwave Technology," IEEE Transactions on Microwave Theory and Techniques 1990;38(5):596-607.
Baronio, F, et al., "Second and third order susceptibilities mixing for supercontinuum generation and shaping," Optical Fiber Technology 2012;18:283-289.
International Search Report and Written Opinion for PCT Patent App. No. PCT/FR2017/050124 (dated May 9, 2017) with English translation of the ISR.

* cited by examiner

DEVICE FOR GENERATING A POLYCHROMATIC AND SPATIALLY SELF-ADAPTED BEAM OF PHOTONS

CROSS REFERENCE TO RELATED APPLICATIONS

This application is a national phase filing under 35 C.F.R. § 371 of and claims priority to PCT Patent Application No. PCT/FR2017/050124, filed on January 20, which claims the priority benefit under 35 U.S.C. § 119 of French Patent Application No. 1650525, filed on Jan. 22, 2016, the contents of each of which are hereby incorporated in their entireties by reference.

BACKGROUND

Some embodiments relate to devices for generating a polychromatic beam of photons, and to analyzing systems that use such devices.

As those of ordinary skill in the art know, in certain fields, such as for example that of the analysis of samples (possibly medical samples), spatially coherent polychromatic laser sources are required. Such sources are frequently called continua because they deliver a beam of photons having wavelengths that are substantially continuously distributed over a large spectral width, typically a few tens of nanometers to a few hundred nanometers.

These sources are produced on the basis of a light-matter interaction employing non-linear effects. They generally include at least one continuous-wave or pulsed laser source (see [R1]) that delivers "primary" photons having a "primary" wavelength, and a microstructured optical fiber or non-linear crystal that is arranged to produce, from the primary photons, an output beam including secondary photons having a plurality of "secondary" wavelengths.

Sources employing a micro-structured optical fiber allow stable emissions with a spectral width extending from the near ultraviolet (or UV) (about 350 nm) to the mid infrared (typically 5 µm) to be obtained. Micro-structured optical fibers made of silica are for example limited in the infrared to 2.4 µm, and have the particularity of confining the luminous power, thereby increasing the light-matter interaction and improving the conversion of the primary wavelength to a large number of secondary wavelengths. However, non-linear micro-structured optical fibers have a small core diameter and therefore, in the presence of a high confinement of energy, the threshold for damage of their material is very quickly reached. Thus, these sources employing a micro-structured optical fiber do not allow high output energies to be obtained. In addition, they do not allow wavelengths belonging to the entire UV domain (shorter than 340 nm) and the entire infrared domain to be obtained simultaneously. Lastly, they do not allow the group velocities of secondary photons of different wavelengths to be equalized, this inducing a desynchronization of secondary photons of different wavelengths over time. As a result, it is impossible to use these sources in certain applications, such as for example multiplex coherent anti-Stokes Raman scattering (CARS), which is in particular used in the field of imaging to identify and locate specific chemical species within a sample.

SUMMARY

The use of nonlinear crystals instead of microstructured optical fibers makes it possible to avoid quickly reaching the threshold for damage. It is however currently recommended, to obtain secondary wavelengths, for the crystal to be very precisely oriented with a phase-matching orientation. Thus, only a few particular orientations associated with one particular primary wavelength allow a spectral continuum to be obtained, and still mainly in the infrared domain. It is also known that crystals with centrosymmetric lattices may generate supercontinua, but mainly using third-order nonlinearity (see [R2]).

Some embodiments address the above issue(s).

Some embodiments are thus directed to a device that is configured to generate a polychromatic beam of photons, and that includes a continuous-wave or pulsed laser source that is able to deliver primary photons having at least one wavelength, forming structure(s) that are able to act on the primary photons to deliver an input beam, and a non-linear crystal that is arranged to produce, from the input beam, a polychromatic output beam including secondary photons having a plurality of wavelengths.

This generating device also includes controller(s) that are arranged to generate, in the non-linear crystal, at least one electric field that is synchronous with the input beam and that is able to induce, in the latter, a phase mismatch via an electro-optical effect in order to convert the primary photons of the input beam into secondary photons having wavelengths belonging to a super-continuum.

Thus, it is possible to obtain a super-continuum of photons the wavelengths of which may range, depending on the requirements, from the far ultraviolet to the far infrared, while minimizing variations in group velocity.

The device according to some embodiments may have other features that may be implemented separately or in combination, and in particular:

- its controller(s) may be arranged to generate, in the nonlinear crystal, a synchronous electric field in a first direction that is perpendicular to a general direction of the input and output beams and/or another synchronous electric field in a second direction that is perpendicular to the general direction of the input and output beams and to this first direction;
- its controller(s) may include, firstly, sampler(s) that are able to split the input beam into a main portion that is directed toward the nonlinear crystal and an auxiliary portion, and secondly, optoelectronic device(s) that are able to generate an electric pulse on reception of each auxiliary portion of the input beam, thirdly, electrodes that are placed against the nonlinear crystal and that are arranged to generate, in the latter, the (each) electric field on reception of each generated electric pulse, and, fourthly, delayer(s) that are arranged to delay the primary photons of the main portion of the input beam so that they reach the nonlinear crystal synchronously with the generated electric field;
- the nonlinear crystal may include, on a beam input face and on a beam output face, semi-reflective mirrors that are able to induce a resonance of the primary photons and/or of the secondary photons;
- at least one of the electrodes may have a spatial structure that is able to induce a spatial modulation of the electric field generated in the nonlinear crystal, able to provoke a modification of the phase mismatch and of a spectral profile of the output beam and/or a modification of a relative orientation of a polarization vector of the input beam with respect to a wavelength conversion axis;
- the optoelectronic device(s) may include what is called a "frozen wave" generator;

it may include at least two nonlinear crystals that are placed one after the other;

the continuous-wave or pulsed laser source may be able to deliver primary photons having what is called a primary wavelength and primary photons having another wavelength equal to the second harmonic of this primary wavelength. In this case, the non-linear crystal may, for example, be what is called a "frequency doubling" at the primary wavelength of the pulsed source.

Advantageously, several improvements of the device are possible and compatible with the aforementioned options, and are able to be implemented separately or in combination:

the nonlinear crystal (CN) is doped with rare-earth ions, this doping allowing it to combine the generation of secondary photons with an amplification of the primary photons and/or of the secondary photons;

the laser source (SL) has the capacity to generate primary photons allowing laser pumping of rare-earth-doped crystals, irrespectively of whether the laser source operates in a pulsed regime or in a continuous-wave regime;

the non-linear crystal (CN) may possess a nonlinearity of the second and/or of the third order;

the non-linear crystal (CN) may be a transparent ceramic and/or a transparent glass-ceramic;

the non-linear crystal (CN) may have a centrosymmetric or non-centrosymmetric molecular arrangement; or indeed the non-linear crystal (CN) may be doped with ions of ytterbium, erbium, thulium, holmium, neodymium, praseodymium, or even cerium, used alone or in combination.

Some embodiments also provide a sample-analyzing system including at least one generating device of the type presented above and able to deliver a polychromatic output beam for analyzing the sample.

For example, such a system may be able to analyze the sample by multiplex coherent anti-Stokes Raman scattering (or CARS).

BRIEF DESCRIPTION OF THE FIGURES

Some embodiments will be better understood on reading the following description, which is given merely by way of example, and with reference to the appended figures, in which.

DETAILED DESCRIPTION OF EXEMPLARY EMBODIMENTS

Some embodiments provide a device DG that is intended to generate a polychromatic beam of photons FS.

Below, the generating device TG is considered, by way of nonlimiting example, to be intended to form part of a sample-analyzing system (optionally for analyzing medical samples). However, some embodiments are not limited to this type of system. Specifically, some embodiments relate to any system that needs to include at least one device that is able to generate a polychromatic beam of photons.

Moreover, the analyzing system will be considered below, by way of nonlimiting example, to be able to analyze samples (S) using multiplex coherent anti-Stokes Raman scattering (or CARS). However, some embodiments are not limited to this type of analysis.

Generally, some embodiments relate to many domains, and in particular bio photonics (and in particular cellular diagnostics), non-linear multimodal imaging, optogenetics, coherence tomography, LIDARs, flow cytometry, the screening of chemical elements remotely (for example for airport security), the inspection of individuals (for example in the medical field), the detection of explosives and the detection of bacteria.

Figure 1:
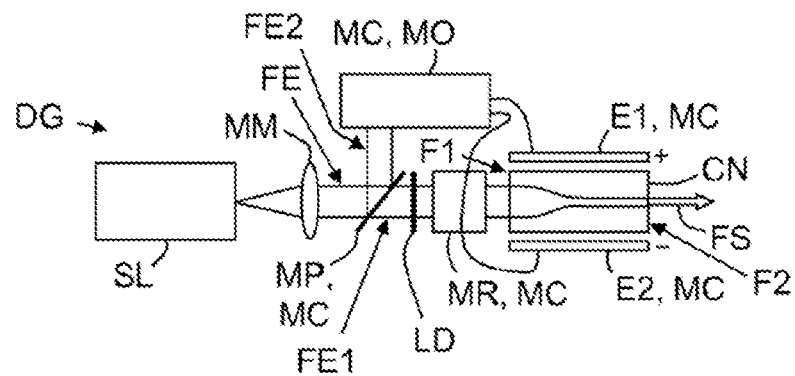
FIG. 1 schematically and functionally illustrates a first embodiment of a generating device according to some embodiments.
Figure 2:
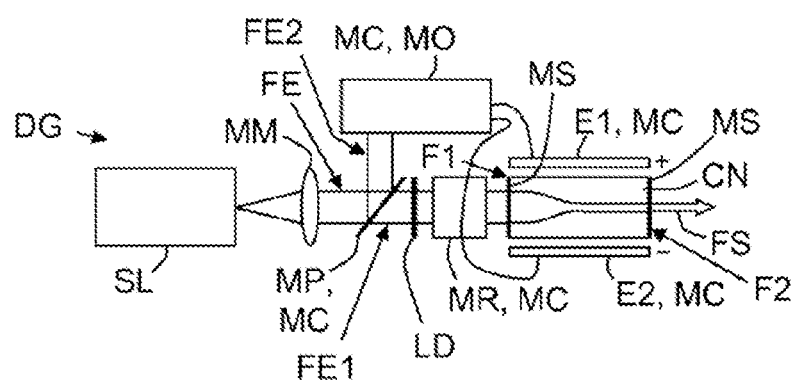
FIG. 2 schematically and functionally illustrates a second embodiment of a generating device according to some embodiments.

FIGS. 1 and 2 schematically show two nonlimiting embodiments of a generating device DG according to some embodiments.

As illustrated, a (generating) device DG includes at least one pulsed laser source SL, forming device(s) MM, at least one nonlinear crystal CN, and controller(s) MC.

It will be noted that this laser source SL may also be a continuous-wave source. In the rest of the description, mention is only made of the case of a pulsed laser source but the various described embodiments are also applicable to a continuous-wave laser source.

The pulsed laser source (or pump laser) SL is able to deliver what are called "primary" photons that have at least one wavelength that is called the "primary wavelength" below. This primary (or pump) wavelength is chosen depending on the applicational requirements, and therefore on the desired spectral band. Therefore, it will possibly belong to the infrared (or IR) domain, to the visible domain or to the ultraviolet (or UV) domain. These primary photons may also belong to one or more domains such as for example an infrared wavelength and its second harmonic.

For example, this pulsed laser source SL may provide a high peak power. In this case, it will possibly, for example, be a question of an Nd:YAG laser producing photons at 1064 nm with pulses ranging from 10 ps to 2 ns.

The forming device(s) MM are able to act on the primary photons in order to deliver an input beam FE. For example, and as illustrated, these forming beams MM may include at least one lens installed downstream of the pulsed laser source SL with respect to the propagation of the primary photons.

It will be noted that, in the nonlimiting examples illustrated in FIGS. 1 and 2, the forming device(s) MM are arranged to deliver, as output, an input beam FE that is non-divergent during passage through the crystal CN (i.e. in which the photons of each pulse propagate substantially parallel to one another in a general direction).

The non-linear crystal CN is arranged to produce, from the input beam FE, a polychromatic output beam FS including what are called "secondary" photons having a plurality of wavelengths. This nonlinearity is advantageously or preferably quadratic.

It will be noted that the non-linear crystal CN is chosen depending on the applicational requirements, and therefore on the desired spectral band and on the primary (or pump) wavelength. By way of example, in the presence of an Nd:YAG laser producing photons at 1064 nm with pulses of 30 ps, it is possible, for example, to use a non-linear crystal CN of bulk periodically-poled lithium niobate (PPLN) manufactured to generate the second harmonic of the radiation of the pulsed laser source SL (or second harmonic generation (SHG)) and to operate at about 50° C., and having a length of 15 mm and a quasi-phase-matching (QPM) pitch (QPM being a technique in which a periodic inversion of the ferroelectric domains is used to make the phase velocities of the fundamental wave (for example 1064 nm) and of the wave of the second harmonic (for example 532 nm) almost equal) equal to 6.75 µm. It will be noted that the pitch of the QPM depends on temperature. Thus, it is possible to have, for example, a pitch of 6.54 µm at 160° C.

However other nonlinear crystals CN may be used, such as for example potassium titanyl phosphate (KTP), or periodically-poled KTP (PPKTP), or lithium triborate ($LiB_3O_5$— or LBO), or even beta barium borate (BBO).

The controller(s) MC are arranged to generate, in the non-linear crystal CN, at least one electric field that is synchronous with the input beam FE and able to induce, in the latter (CN), a phase mismatch via an electro-optical effect. This phase mismatch is able to provoke the conversion of the primary photons of the input beam FE into secondary photons having wavelengths belonging to a super-continuum.

In fact, the electro-optical effect provokes a modification of the refractive index of the material making up the non-linear crystal CN, thereby changing the conditions of the phase mismatch between the primary photons and the secondary photons, this modulating the spectral profile of the output secondary photons.

The axis of propagation of the primary and secondary wavelengths is almost perpendicular to the direction of the electric field inducing the electro-optical effect.

The direction in which the crystal CN is initially cut and the electro-optical effect are used to adjust the conditions of propagation in the non-linear crystal CN in order to obtain a phase mismatch that promotes the generation of secondary photons. The secondary photons are generated in a very high-intensity regime (very high intensity primary photons), and as a result the spatial profile of the input beam FE is modified simultaneously with the frequency conversion. This modification of the profile simultaneously in the space domain and in the time domain may result either in an increase in confinement, this having the effect of decreasing the diameter of the input beam FE, as is schematically illustrated in the non-linear crystals CN of FIGS. 1 and 2, or in a decrease in confinement, this having the effect of increasing the diameter of the input beam FE. The first alternative, called "adiabatic self-focused propagation", allows wide-band conversion to be more easily achieved in the non-linear crystal CN. The second alternative, called "defocusing propagation", allows the non-linear crystal CN to be protected from any optical damage during very energetic excitations with the input beam FE (reverse saturable absorption effect integrated into the non-linear propagation).

The reverse saturable absorption effect results in a limitation of the output power density (power density is equal to the ratio between the power and the area of the beam). It is thus possible to obtain this effect if an increase in power is accompanied by an increase in the area illuminated by the beam (this is the case if the power of the primary beam induces a defocus).

As illustrated in FIGS. 1 and 2, the controller(s) MC are arranged to generate, in the non-linear crystal CN, a first synchronous electric field in a first direction that is perpendicular to the general direction of the input beam FE and of the output beam FS and/or a second synchronous electric field in a second direction that is perpendicular to the general direction of the input beam FE and of the output beam FS and to this first direction. It is then possible to modify the refractive index of the material in various ways in the two directions perpendicular to the direction of propagation of the beams. This allows a larger choice of phase mismatches to be obtained. However, a point of zero phase mismatch may also be used. These various options that may or may not be implemented will be returned to below.

Also as illustrated in FIGS. 1 and 2, the controller(s) MC may include at least sampler(s) MP, optoelectronic device(s) MO, electrodes Ej and delayer(s) MR.

The sampler(s) MP are installed between the pulsed laser source SL and the non-linear crystal CN. They are able to split the input beam FE into a main portion FE1 that is directed toward the non-linear crystal CN and an auxiliary portion FE2 that is directed toward the optoelectronic device(s) MO.

For example, and as nonlimitingly illustrated, these sampler(s) MP may include a semi-reflective mirror that is inclined, for example by 45°, with respect to a plane perpendicular to the general direction of the input beam FE.

The optoelectronic device(s) MO are able to generate an electric pulse on reception of each auxiliary portion FE1 of the input beam. Each electric pulse, which pulse is synchronous with the optical pulse (primary photons of FE1) that generates it and which is intended for the electrodes Ej, is advantageously or preferably of high voltage. The optoelectronic device(s) MO may, for example, take the form of what is called a "frozen wave" generator, which may generate electric pulses of a magnitude higher than one kilovolt and with a unipolar or bipolar profile (typically of 1 ns to 3 ns duration). The bipolar profile makes it possible to rapidly pass from one direction of polarization of the crystal CN to an inverse direction, favoring ultrarapid modification of the phase match in real-time.

The electrodes Ej are placed against the non-linear crystal CN and are arranged to generate in the latter (CN) the (each) electric field on reception of each electric pulse generated by the optoelectronic device(s) MO. Introducing a liquid or a conductive paste between the electrode Ej and the crystal CN promotes the penetration of the electric field into the crystal CN. This conductive paste may, for example, be a conductive adhesive such as a silver-containing resin.

It will be understood that to generate the aforementioned first electric field, two electrodes Ej (here j=1 or 2) that are placed against two first opposite faces of the non-linear crystal CN are used, and that to generate the aforementioned second electric field, two electrodes Ej that are placed against two second opposite faces of the non-linear crystal CN are used, the second opposite faces being perpendicular to the first faces. These first and second faces are parallel to the general direction of the input beam FE and of the output beam FS, and are perpendicular to the input face F1 of the non-linear crystal CN, i.e. to the face via which the input beam FE penetrates, and to the exit face F2 of the non-linear crystal CN, i.e. to the face via which the output beam FS exits. When it is desired to generate both the first electric field and the second electric field, two electrodes Ej are placed against two first opposite faces of the non-linear crystal CN, and two other electrodes Ej' are placed against two second opposite faces of the non-linear crystal CN, the second opposite faces being perpendicular to the first faces. In the latter alternative, the optoelectronic device(s) MO either generate two electric pulses on reception of each auxiliary portion FE2 of the input beam, and synchronously transmit these two electric pulses to the two pairs of electrodes Ej so that they create two electric fields intended to induce two phase mismatches in two perpendicular directions, or generate a single electric pulse on reception of each auxiliary portion FE2 of the input beam, and transmit this single electric pulse to the pair of electrodes Ej in question so that it creates an electric field intended to induce a phase mismatch in one direction.

The delayer(s) MR are arranged to delay the primary photons of the main portion FE1 of the entrance beam FE so that they reach the non-linear crystal CN synchronously with the (each) generated electric field. For example, these delayer(s) MR may take the form of a delay line that allows each optical pulse (primary photons) that reaches the non-linear crystal CN to be synchronized with the corresponding electric pulse generated by the optoelectronic device(s) MO.

It will be noted, as nonlimitingly illustrated in the second example of FIG. 2, that the non-linear crystal CN may optionally include, on its entrance face F1 and on its exit face F2, semi-reflective mirrors MS that are able to induce a resonance of the primary photons and/or of the secondary photons. This option is intended to facilitate the generation of a broad spectrum in the non-linear crystal CN by virtue of the electro-optical effect. The effect of this resonance is to increase the conversion efficiency by multiplying the number of passages through the crystal CN (specifically, the intensity of the converted beam is proportional to the square of the length of non-linear medium passed through). These semi-reflective mirrors MS may either be added elements, or be defined by a, for example dielectric, surface treatment.

It will also be noted, although not shown in FIGS. 1 and 2, that at least one of the electrodes Ej may have a spatial structure that is able to induce a spatial modulation of the electric field generated in the non-linear crystal CN. This spatial modulation is able to provoke a modification of the phase mismatch and of the spectral profile of the output beam FS and/or a modification of the relative orientation of the polarization vector of the input beam FE1 with respect to the wavelength conversion axis. This polarization vector of the input beam FE1 may, as illustrated in FIGS. 1 and 2, be oriented via a half-wave (or $\lambda/2$) plate LD, or indeed be modified via a quarter-wave (or $\lambda/4$) plate.

It will be understood that in the presence of such a spatial structure (or nonuniformity) the electric field becomes nonuniform, thereby allowing the wide-band non-linear conversion to be controlled the entire length of the propagation through the non-linear crystal CN. Thus, the electric field may, for example, be stronger in the vicinity of the entrance face F1 than in the vicinity of the exit face F2. It will be noted that this structure may optionally be periodic in order to control the phase mismatch by modifying the velocity of the primary and secondary photons.

Figure 3:
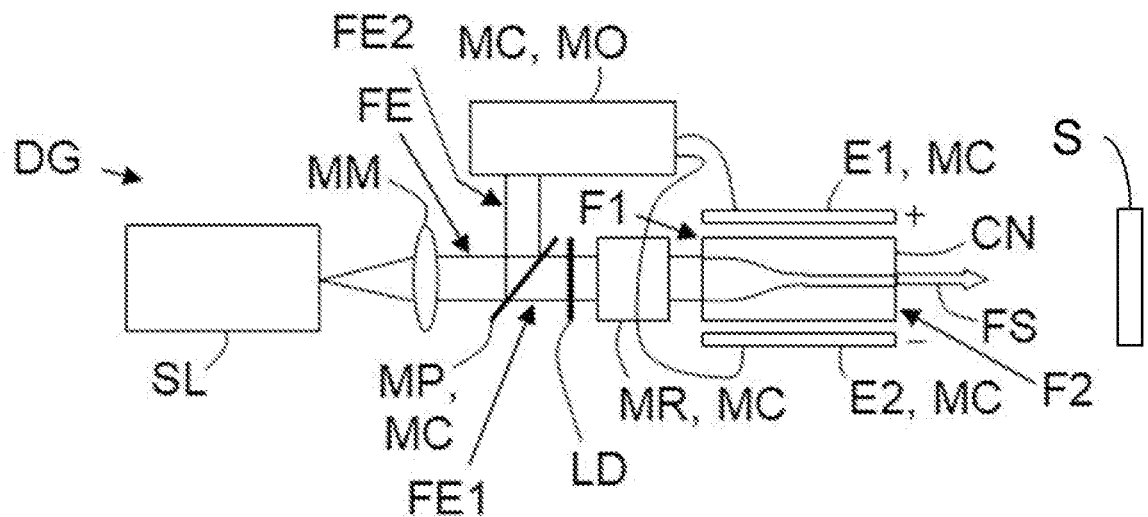
FIG. 3 schematically and functionally illustrates a generating device according to some embodiments.
Figure 4:
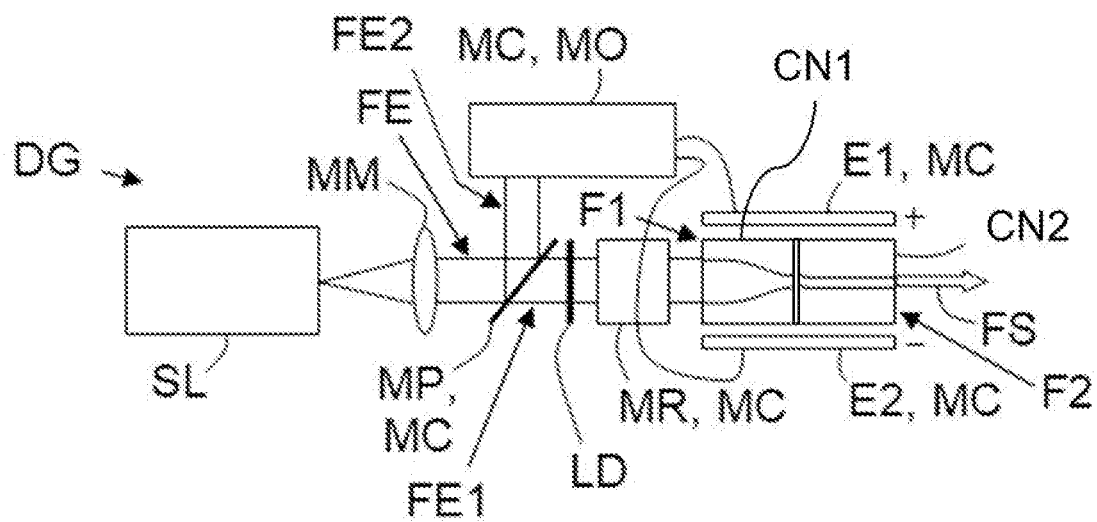
FIG. 4 schematically and functionally illustrates a generating device according to some embodiments.

It will also be noted, shown in FIGS. 3 and 4, that the device DG may optionally include at least two nonlinear crystals CN1 and CN2 placed one after the other. In this case, each crystal is cut in a particular direction. This allows the phase match to be changed substantially with a view to obtaining a broader conversion of the primary photons (it not being possible to do this by biasing the electrodes Ej, which has a more limited effect on the phase match).

It will also be noted that the pulsed laser source SL may be able to deliver primary photons that have the primary (or fundamental) wavelength and primary photons having another wavelength equal to the second harmonic of the primary wavelength. In this case, the non-linear crystal CN may be what is called a "frequency doubler" for the primary photons. It is then pumped simultaneously by photons of two different wavelengths, thereby allowing the number of wavelengths of the secondary photons of the super-continuum to be increased.

The super-continuum is generated in the crystals by virtue of the power of the pump wave, which transfers its energy to other wavelengths. A better generation may thus be obtained if the primary photons are reamplified during their passage through the crystal. The depletion of primary photons, due to the frequency conversion, is compensated for via a laser amplification. The secondary photons may also be amplified to obtain more output power.

This amplification may be achieved by adding one or more rare-earth ions to (or doping) the crystal and by pumping them with one or more pump waves in a continuous-wave or pulsed regime. This type of amplification process has for example been employed in optical fibers (see [R3]).

In addition, nonlinear crystals are generally obtained using a crystal growth process that is for example a "Czochralski" growth process (see [R4] and [R5]). After growth, the crystals are cut with a particular orientation and may be used in laser-source and/or non-linear-conversion experiments.

It is also known that the same crystals may be obtained using a manufacturing process based on an agglomeration of a powder of micro-crystals. After agglomeration, the compact is consolidated via a very-high-temperature pressing operation (referred to as sintering). A crystal composed of microcrystals (a ceramic) is then obtained and may be as transparent as its homologue obtained via crystal growth (see [R6]). For particular sintering-temperature conditions, a plurality of phases may appear in the material. The crystal is then contained in a vitreous phase. Glass-ceramic is then referred to, i.e. a material that locally possesses a vitreous phase and a crystalline phase (see [R7]).

Thus, several improvements to the device are possible and compatible with the aforementioned options:
  the nonlinear crystal (CN) may be doped with rare-earth ions, this doping allowing it to combine the generation of secondary photons with an amplification of the primary photons and/or of the secondary photons;
  the laser source (SL) has the capacity to generate primary photons allowing laser pumping of rare-earth-doped crystals, irrespectively of whether the laser source operates in a pulsed regime or in a continuous-wave regime;
  the non-linear crystal (CN) may possess a nonlinearity of the second and/or of the third order;
  the non-linear crystal (CN) may be a transparent ceramic and/or a transparent glass-ceramic;
  the non-linear crystal (CN) may have a centrosymmetric or non-centrosymmetric molecular arrangement; or indeed
  the non-linear crystal (CN) may be doped with ions of ytterbium, erbium, thulium, holmium, neodymium, praseodymium, or even cerium, used alone or in combination.

Some embodiments have several advantages, among which:
  it makes it possible to obtain a super-continuum with a high spectral power density because the cross section of the non-linear crystal is much larger than the cross section of an optical-fiber core;
  it makes it possible to minimize the temporal separation between the primary photons and the secondary photons after passage through a non-linear crystal of small length, and thus to obtain a more coherent polychromatic emission;

it makes it possible to obtain photons having wavelengths ranging from the far ultraviolet to the far infrared, by virtue of the large transparency regions of nonlinear crystals; and it makes it possible to adapt the spectral profile of the secondary photons and to adjust the spectral power density depending on the energy of the available pulsed laser source by virtue of the modification of the propagation parameters in the nonlinear crystal resulting from the spatially and temporally controlled electric excitation.

Some embodiments have been illustrated and described in detail in the drawings and the preceding description. The latter must or should be considered to be illustrative and given by way of example and not as limiting some embodiments to this description alone. Many variant embodiments are possible.

LIST OF REFERENCES

[R1] Mussot, A.; Kudlinski, A.; Kolobov, M.; Louvergneaux, E.; Douay, M.; Taki, M.; "Observation of extreme temporal events in CW-pumped supercontinuum" Optics Express 17(19) 17010-7015 (2009)

[R2] F. Silva, D. R. Austin, A. Thai, M. Baudisch, M. Hemmer, D. Faccio, A. Couairon & J. Biegert; "Multioctave supercontinuum generation from mid-infrared filamentation in a bulk crysta" nature communications |3:807| Dal: 10.1038

[R3] Roy, Aude; Leproux, Philippe; Roy, Philippe; Auguste, Jean-Louis; Couderc, Vincent, "Supercontinuum generation in a nonlinear Yb-doped, double-clad, microstructured fiber" Journal of the Optical Society of America B 24(4) 788-791(2007)

[R4] M. Spiesser, Jan Czochralski "Methode de tirage des cristaux", Bulletin GFCC (May 1999)

[R5] J. Czochralski, Z. Physik Chem. 92 (1918) 219

[R6] Garanin, S. G.; Rukavishnikov, N. N.; Dmitryuk, A. V.; Zhilin, A. A.; Mikhaĭlov, M. D. Laser ceramic. 1. Production methods Journal of Optical Technology 77(9) 565-576 (2010)

[R7] Chen, Xiaobo; Song, Zengfu; Hu, Lili; Zhang, Junjie; Wen, Lei, "Experimental study on a nonlinear photonics process of Er(0.5)Yb(3):FOV oxyfluoride nanophase vitroceramics"; Optics Letters 32(14) 2019-2021 (2007)

The invention claimed is:

1. A device for generating a polychromatic beam of photons, comprising:
   a laser source that is able to deliver primary photons having at least one wavelength,
   a forming device able to act on the primary photons to deliver an input beam,
   a non-linear crystal that is arranged to produce, from the input beam, a polychromatic output beam including secondary photons having a plurality of wavelengths, and
   a controller arranged to generate, in the non-linear crystal, at least one electric field that is synchronous with the input beam and able to induce, in the latter, a phase mismatch between the primary photons and the secondary photons, via an electro-optical effect which modifies a refractive index of a material of the non-linear crystal (CN) in order to convert the primary photons of the input beam into secondary photons in order to form a super-continuum.

2. The device as claimed in claim 1, wherein the controller is arranged to generate, in the nonlinear crystal, a synchronous electric field in a first direction that is perpendicular to a general direction of the input and output beams and/or another synchronous electric field in a second direction that is perpendicular to a general direction of the input and output beams and to the first direction.

3. The device as claimed in claim 2, wherein the controller includes i) a sampler able to split the input beam into a main portion that is directed toward the nonlinear crystal and an auxiliary portion, ii) an optoelectronic device able to generate an electric pulse on reception of each auxiliary portion of the input beam, iii) electrodes that are placed against the nonlinear crystal and that are arranged to generate, in the latter, the electric field on reception of each generated electric pulse, and iv) a delayer arranged to delay the primary photons of the main portion of the input beam so that they reach the nonlinear crystal synchronously with the generated electric field.

4. The device as claimed in claim 1, wherein the controller includes i) a sampler able to split the input beam into a main portion that is directed toward the nonlinear crystal and an auxiliary portion, ii) an optoelectronic device able to generate an electric pulse on reception of each auxiliary portion of the input beam, iii) electrodes that are placed against the nonlinear crystal and that are arranged to generate, in the latter, the electric field on reception of each generated electric pulse, and iv) a delayer arranged to delay the primary photons of the main portion of the input beam so that they reach the nonlinear crystal synchronously with the generated electric field.

5. The device as claimed in claim 4, wherein the nonlinear crystal includes, on an input face and on an output face, semi-reflective mirrors that are able to induce a resonance of the primary photons and/or of the secondary photons.

6. The device as claimed in claim 5, wherein at least one of the electrodes has a spatial structure that is able to induce a spatial modulation of the electric field generated in the nonlinear crystal, able to provoke a modification of the phase mismatch and of a spectral profile of the output beam and/or a modification of a relative orientation of a polarization vector of the input beam with respect to a wavelength conversion axis.

7. The device as claimed in claim 5, wherein the optoelectronic device includes a frozen-wave generator.

8. The device as claimed in claim 4, wherein at least one of the electrodes has a spatial structure that is able to induce a spatial modulation of the electric field generated in the nonlinear crystal, able to provoke a modification of the phase mismatch and of a spectral profile of the output beam and/or a modification of a relative orientation of a polarization vector of the input beam with respect to a wavelength conversion axis.

9. The device as claimed in claim 4, wherein the optoelectronic device includes a frozen-wave generator.

10. The device as claimed in claim 1, further comprising at least two nonlinear crystals that are placed one after the other.

11. The device as claimed in claim 1, wherein the laser source is able to deliver primary photons having a primary wavelength and primary photons having another wavelength equal to a second harmonic of the primary wavelength, and in that the nonlinear crystal is a frequency doubler at the primary wavelength.

12. The device as claimed in claim 1, wherein the nonlinear crystal is doped with rare-earth ions, this doping allowing it to combine the generation of secondary photons with an amplification of the primary photons and/or of the secondary photons.

13. The device as claimed in claim 12, wherein the laser source used has the capacity to generate primary photons allowing laser pumping of rare-earth-doped crystals.

14. The device as claimed in claim 1, wherein the nonlinear crystal possesses a nonlinearity of the second and/or third order.

15. The device as claimed in claim 1, wherein the nonlinear crystal is a transparent ceramic and/or transparent glass-ceramic.

16. The device as claimed in claim 1, wherein the nonlinear crystal has a centrosymmetric molecular arrangement.

17. The device as claimed in claim 1, wherein the nonlinear crystal is doped with ions of ytterbium, erbium, thulium, holmium, neodymium, praseodymium, or cerium, used alone or in combination.

18. A sample-analyzing system, comprising:
   a generating device as claimed in claim 1, able to deliver a polychromatic output beam for analyzing the sample.

19. The system as claimed in claim 18, configured to perform an analysis of the sample by multiplex coherent anti-Stokes Raman scattering.

* * * * *